United States Patent [19]
Johnson et al.

[11] 3,814,136
[45] June 4, 1974

[54] PRESSURE SEALING CASTING PLUG
[75] Inventors: Richard E. Johnson, 2316 53rd Ave. W., Bradenton, Fla. 33507; Harley D. Johnson, Bradenton, Fla.
[73] Assignee: said Richard E. Johnson, by said Harley D. Johnson
[22] Filed: June 30, 1972
[21] Appl. No.: 268,121

[52] U.S. Cl.................... 138/89, 138/92, 220/46 R
[51] Int. Cl............................................. F16l 55/10
[58] Field of Search...................... 138/89, 96 R, 92; 220/24 A, 42 B, 46 R; 215/48, 85

[56] References Cited
UNITED STATES PATENTS
2,867,350   1/1959   Fleckenstein ................. 220/46 R X
3,313,113   4/1967   Maxson et al. ................. 138/92 X OTHER PUBLICATIONS
"Removable Plugs Seal Pipe Ends, Product Engineering, Jan. 6, 1964.

*Primary Examiner*—Charles A. Ruehl
*Attorney, Agent, or Firm*—Clarence A. O'Brien; Harvey B. Jacobson

[57] ABSTRACT

A closure plug for a casting core hole including opposite end portions and an intermediate portion defined therebetween. A first or inner end of the plug is cylindrical and includes a circumferential groove in which sealing O-ring is secured. The second outer end of the plug is also cylindrical for flush seating in the outer end of the associated casting core hole. The intermediate portion of the plug is diametrically reduced and an annular washer constructed of stiff but somewhat resilient material is disposed thereon. The washer includes circumferentially spaced radially outwardly projecting integral resilient fingers inclined slightly toward the second outer end of the plug. The outer extremities of the fingers lie generally on a circular path which is slightly larger in diameter than the fingers, when the closure plug is inserted within a casting hole, are deflected toward the outer second end of the plug and disposed in tight frictional engagement with the walls of the core hole so as to preclude any subsequent movement of the closure plug outwardly of the core hole.

7 Claims, 5 Drawing Figures

PRESSURE SEALING CASTING PLUG

All quadra-jet carburetors having a side connection for the discharge end of a fuel line are provided with a fuel inlet boss on the casting of the carburetor body and the fuel inlet passage opens into a finished core hole whose outer end is closed by a welch plug. The welch plug performs the function of closing the outer end of the core hole and sealing against the leakage of gasoline from the outer end of the core hole, the gasoline within the core hole being subject to existing fuel pump pressures. In order that the welch plug be compatible with the aluminum alloy material of which the body of the carburetor is constructed, the welch plug is constructed of aluminum and repeated heating and cooling of the carburetor and welch plug during operation of the associated engine has a tendency to cause metal fatigue with the result that the welch plug is loosened, thus creating a gasoline leak to the outside of the carburetor. The pressure-sealing closure plug of the instant invention has been specifically designed as a replacement for the above aforementioned welch plug and is constructed in a manner whereby a positive liquid seal between the plug and the associated casting core hole is provided together with means for positively preventing outward displacement of the closure plug due to internal gasoline pressures.

Further, the closure plug of the instant invention has been designed in a manner enabling it to be readily inserted in operative position upon the removal of a leaking welch plug.

The main object of this invention is to provide a replacement closure plug for a casting core hole.

Another object of this invention, in accordance with the immediately preceding object is to provide a closure plug replacement for a welch plug type closure utilized to close casting core holes in carburetor bodies.

A still further object of this invention is to provide a closure plug including a first means operative to effect a positive fluid-tight seal between the plug and the associated casting core hole and a second means for securing the casting core hole closure plug within the core hole against outward displacement relative thereto.

Yet another object of this invention is to provide a closure plug in accordance with the preceding objects constructed in a manner whereby it may be readily utilized as a replacement for a welch plug after removal of the latter.

A final object of this invention to be specifically enumerated herein is to provide a pressure-sealing casting plug in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
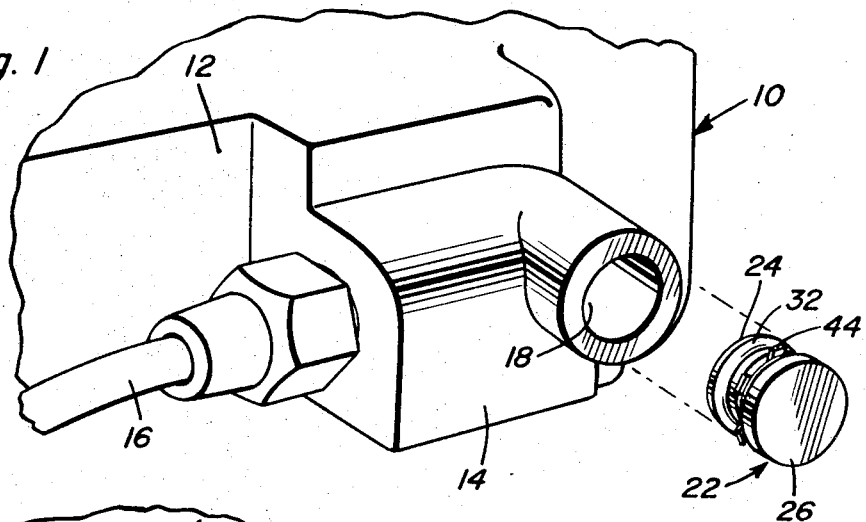
FIG. 1 is a fragmentary perspective view of a conventional form of quadra-jet carburetor with the pressure-sealing casting plug of the instant invention in exploded position relative to an associated casting core hole to be closed by the plug.
Figure 2:
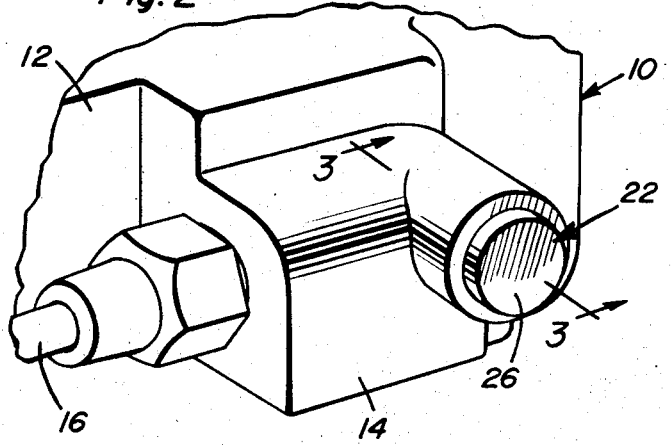
FIG. 2 is a fragmentary perspective view similar to FIG. 1 but with the pressure-sealing casting plug in position sealing the outer end of the casting core hole.
Figure 4:
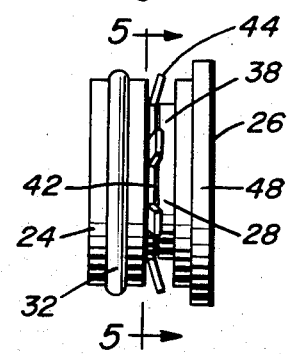
FIG. 4 is a side elevational view of the casting core hole plug.
Figure 3:
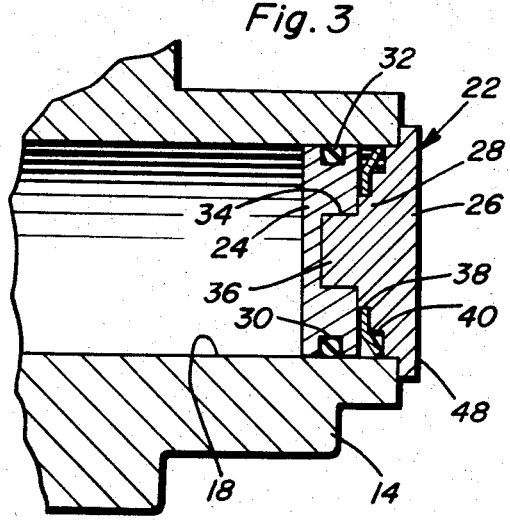
FIG. 3 is a fragmentary enlarged vertical sectional view taken substantially upon the plane indicated by the section line 3—3 of FIG. 2.
Figure 5:
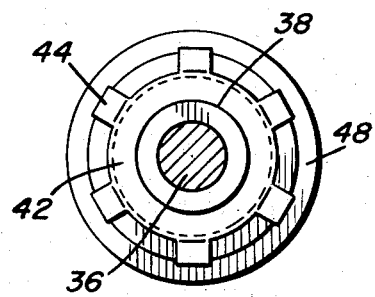
FIG. 5 is a transverse vertical sectional view taken substantially upon the plane indicated by the section line 5—5 of FIG. 4.

Referring now more specifically to the drawings, the numeral 10 generally designates a conventional form of quadra-jet carburetor including a body 12 defining a fuel inlet boss 14 into which the discharge end of a fuel line 16 opens and including a finished casting core hole 18.

Conventionally, the core hole 18 is closed by means of a welch plug. However, when the welch plug has been in use for an indeterminate time during which the carburetor and plug are alternately heated and cooled many times over, metal fatigue is experienced by the casting portions defining the core hole 18 and the plug becomes loosened in the core hole 18 with the result that fuel under pressure within the boss 14 leaks outwardly of the carburetor body 12 about the welch plug.

The closure plug of the instant invention is referred to in general by the reference numeral 22 and comprises a reliable, readily insertable and permanent repair item for the fatigued welch plug.

In order to remove a welch plug to be replaced by the closure plug 22, the rolled edge retaining the welch plug in the core hole 18 is removed in any convenient manner, such as by filing, and a small hole is drilled through the center of the aluminum welch plug after which a metal screw is secured in the drilled hole and grasped with a suitable tool, such as pliers. Thereafter, the pliers may be tapped with a hammer in order to withdraw the plug from the core hole 18. Finally, before the closure plug 22 is inserted within the core hole 18, the edges of the body 12 defining the outer extremity of the core hole 18 may be chamfered with a pocket knife or the like to remove existing burrs or rough spots and thereafter the core hole may be blown out to remove foreign matter and lubricated with oil to assist in the insertion of the closure plug 22.

The closure plug 22 comprises first and second end portions 24 and 26 and an intermediate portion 28. The first or inner end portion 24 comprises a cylindrical disc including a circumferentially extending groove 30 in which a resilient sealing O-ring 32 is seated. The disc or end portion 24 includes a central blind bore or recess 34 in its outer side face in which a short cylindrical stub shank 36 carried by the end portion 26 is secured by a press fit. The intermediate portion 28 is defined on the second end portion 26 and includes first and second diametrically reduced portions 38 and 40 immediately adjacent each other and the first and second end portions 24 and 26. The first diametrically reduced portion or zone 38 is smaller in diameter than the second diametrically reduced zone 40 and a washer 42 constructed of stiff but resilient material is disposed on the first diametrically reduced zone 38. The outside diameter of the washer 42 is slightly greater than the diameter of the second zone 40 and the washer 42 additionally includes circumferentially spaced and radially outwardly projecting integral fingers 44 which are inclined slightly away from the first end portion 24. The fingers 44 include outer extremities disposed along a circular path which is slightly larger in diameter than the diameter of the first end portion 24 and the second end portion 26 is of substantially the same diameter as the end portion 24 and includes a radially outwardly projecting circumferentially extending flange 48 on its terminal end remote from the end portion 24.

When assembling the closure plug 22, the washer 42 is first applied to the first zone 38 after which the end portions 24 and 26 may be secured together by pressing the shank 36 into the blind bore 34. Thereafter, the sealing O-ring 32 may be applied to the second end portion 24 and seated in the groove 30. After the core hole 18 has been prepared to receive the closure plug 22, the latter is inserted into the core hole 18 which snugly receives the end portion 24 and the end portion 26 with the flange 48 abutting the outer face of the casting through which the core hole 18 opens. Of course, as the fingers 44 of the washer 42 are slightly further angulated away from the end portion 24 due to their contact with the internal surfaces of the hole 18 as the plug 22 is being inserted in the core hole 18, the outer ends of the fingers 44 frictionally grip the walls of the core hole 18 and thus prevent subsequent outward axial displacement of the closure plug 22 relative to the core hole 18. Thus, the washer 42 and its fingers 44 serve to maintain the closure plug 22 within the core hole 18 against removal therefrom and the sealing ring 32 forms a fluid-tight seal between the walls of the core hole 18 and the first end portion 24 of the closure plug 22. Thus, even though the inner portion of the core hole 18 is subject to fuel pump pressures, these pressures are incapable of outwardly displacing the closure plug 22 from the core hole 18. Also, inasmuch as the core hole plug 22 is retained within the core hole 18 by means of the fingers 44, repeated alternate heating and cooling of the body 14 and plug 22 will not result in the plug 22 being loosened within the core hole 18. Also, any suitable material, such as neoprene, may be utilized in the construction of the sealing ring 32.

The second diagrametrically reduced zone 40 provides sufficient clearance for the fingers 44 of the ring 42 to flex toward the second outer end of the plug 22 as the plug is inserted within the core hole 18. Further, inasmuch as the shank of the second end portion 26 is secured to the first end portion 24 by means of a press fit between the shank 36 and the blind bore 34 as opposed to a throughbore formed in the first end portion 24, there is no possible way that fuel may leak pass the second end portion 26.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows

1. A plug for fluid pressure sealing one end of a bore, said plug defining an elongated body having a first and second inner and outer end portions and an intermediate portion, said inner end portion including circumferentially extending fluid seal means for establishing a fluid-tight seal between said inner end portion and the walls of the bore into which said plug is snugly received, said intermediate portion including circumferentially spaced and generally radially outwardly projecting stiff but at least somewhat flexible fingers, at least the outer ends of said fingers being inclined slightly toward said outer end portion of said plug and being adapted to frictionally engage said walls of said bore in a dragging action as said inner end of said plug is telescoped into said bore and preventing subsequent withdrawal of said plug from said bore, said intermediate portion including first and second axially spaced and adjacent zones of reduced diameter with said first and second zones being disposed adjacent said first and second end portions, respectively, a generally planar annulus snugly disposed on said first zone of said intermediate portion with said fingers projecting generally radially outwardly therefrom, at least the outer ends of said fingers being inclined toward said second end portion and disposed radially outwardly of said second zone, one of said end portions having an axial blind bore formed therein opening toward the other end portion, said intermediate portion being formed integrally with said other end portion and including an axial cylindrical shank secured in said bore.

2. The combination of claim 1, wherein said first zone is of smaller diameter than said second zone.

3. The combination of claim 2, wherein said annulus is of a diameter generally equal to the diameter of said second zone and said fingers are of a radially extent slightly greater than the radial difference between said first and second zones.

4. A plug for fluid pressure sealing one end of a bore, said plug defining an elongated body having a first and second inner and outer end portions and an intermediate portion, said inner end portion including circumferentially extending fluid seal means for establishing a fluid-tight seal between said inner end portion and the walls of the bore into which said plug is snugly received, said intermediate portion including circumferentially spaced and generally radially outwardly projecting stiff but at least somewhat flexible fingers, at least the outer ends of said fingers being inclined slightly toward said outer end portion of said plug and being adapted to frictionally engage said walls of said bore in a dragging action as said inner end of said plug is telescoped into said bore and preventing subsequent withdrawal of said plug from said bore, said first end portion including an axial blind bore opening toward said second end portion, said intermediate portion being formed integrally with said second end portion and including an axial cylindrical shank pressfitted into said blind bore.

5. The combination of claim 4, wherein said first end portion includes a circumferentially extending and radially outwardly opening groove, said seal means comprising a sealing ring seated in said groove.

6. The combination of claim 5, wherein said second end portion is of substantially the same diameter as said first end portion and includes a terminal end circumferentially extending and radially outwardly projecting abutment flange.

7. A plug for fluid pressure sealing one end of a bore, said plug defining an elongated body having a first and second inner and outer end portions and an intermediate portion, said inner end portion including circumferentially extending fluid seal means for establishing a fluid-tight seal between said inner end portion and the walls of the bore into which said plug is snugly received, said intermediate portion including circumferentially spaced and generally radially outwardly projecting stiff but at least somewhat flexible fingers, at least the outer ends of said fingers being inclined slightly toward said outer end portion of said plug and being adapted to frictionally engage said walls of said bore in a dragging action as said inner end of said plug is telescoped into said bore and preventing subsequent withdrawal of said plug from said bore, one of said end portions having an axial blind bore formed therein opening toward the other end portion, said intermediate portion being formed integrally with said other end portion and including an axial cylindrical shank press-fitted into said blind bore.

* * * * *